(12) United States Patent
Lee

(10) Patent No.: US 11,351,970 B2
(45) Date of Patent: Jun. 7, 2022

(54) HYDRAULIC CONTROL APPARATUS OF BRAKE SYSTEM

(71) Applicant: MANDO CORPORATION, Pyeongtaek-si (KR)

(72) Inventor: Ju Sung Lee, Yongin-si (KR)

(73) Assignee: Mando Corporation, Pyeongtaek-si (KR)

( * ) Notice: Subject to any disclaimer, the term of this patent is extended or adjusted under 35 U.S.C. 154(b) by 297 days.

(21) Appl. No.: 16/353,193

(22) Filed: Mar. 14, 2019

(65) Prior Publication Data

US 2019/0283725 A1    Sep. 19, 2019

(30) Foreign Application Priority Data

Mar. 14, 2018  (KR) .................. 10-2018-0029558
Mar. 14, 2018  (KR) .................. 10-2018-0029862
Mar. 14, 2018  (KR) .................. 10-2018-0029874
Mar. 14, 2018  (KR) .................. 10-2018-0029878

(51) Int. Cl.
*B60T 8/40*    (2006.01)
*B60T 11/10*   (2006.01)
*B60T 8/36*    (2006.01)

(52) U.S. Cl.
CPC .............. *B60T 11/10* (2013.01); *B60T 8/368* (2013.01); *B60T 8/4022* (2013.01); *B60T 8/4031* (2013.01)

(58) Field of Classification Search
CPC ...... B60T 8/3675; B60T 8/368; B60T 8/4022; B60T 8/4031
See application file for complete search history.

(56) References Cited

U.S. PATENT DOCUMENTS

| | | | | |
|---|---|---|---|---|
| 5,668,422 A * | 9/1997 | Deynet | ................. | B60T 8/3675 310/239 |
| 5,894,180 A * | 4/1999 | Volz | ......................... | H02K 5/10 310/89 |
| 6,113,364 A * | 9/2000 | Haecker | ................ | B60T 8/4031 417/434 |
| 6,142,751 A * | 11/2000 | Krauter | ................... | B60T 8/368 303/116.4 |
| 6,390,133 B1 * | 5/2002 | Patterson | .............. | B60T 8/3615 138/30 |
| 6,682,325 B1 * | 1/2004 | Beck | ........................ | B60T 8/368 417/440 |
| 7,264,317 B2 * | 9/2007 | Beck | ........................ | B60T 8/368 303/10 |
| 7,422,421 B2 * | 9/2008 | Sakai | ...................... | B60T 8/368 277/514 |
| 2002/0102168 A1 * | 8/2002 | Gegalski | ................. | B60T 8/368 417/415 |
| 2016/0352172 A1 * | 12/2016 | Fan | ....................... | H02K 1/148 |
| 2018/0226845 A1 * | 8/2018 | Chan | ..................... | H02K 1/148 |
| 2018/0241261 A1 * | 8/2018 | Yamashita | ............... | H02K 3/12 |

\* cited by examiner

*Primary Examiner* — Nicholas J Lane

(74) *Attorney, Agent, or Firm* — Morgan, Lewis & Bockius LLP

(57) ABSTRACT

Disclosed is a hydraulic control apparatus of a brake system including a modulator block having a motor bore, and a motor including a cover that covers an opening of a case accommodating a stator and a rotor and is supported on one side of the modulator block, wherein a vent hole for air flow between the inside and the outside of the motor is formed on the cover and a communication passage for communicating the motor bore and the vent hole is formed in the modulator block.

20 Claims, 22 Drawing Sheets

HYDRAULIC CONTROL APPARATUS OF BRAKE SYSTEM

CROSS-REFERENCE TO RELATED APPLICATION(S)

This application is based on and claims priority under 35 U.S.C. § 119 to Korean Patent Application No. 10-2018-0029558, filed on Mar. 14, 2018, Korean Patent Application No. 10-2018-0029862, filed on Mar. 14, 2018, Korean Patent Application No. 10-2018-0029878, filed on Mar. 14, 2018 and Korean Patent Application No. 10-2018-0029874, filed on Mar. 14, 2018 in the Korean Intellectual Property Office, the disclosures of which are incorporated by reference herein in their entireties.

BACKGROUND

1. Technical Field

The present disclosure relates to a hydraulic control apparatus of a brake system.

2. Description of the Related Art

Generally, an electronic control brake system is intended to obtain a powerful and stable braking force by effectively preventing a vehicle from slipping. As an example of a brake system, there are disclosed an anti-lock brake system (ABS) for preventing slippage of the wheels during braking, a brake traction control system (BTCS) for preventing slippage of the drive wheels when the vehicle suddenly starts or suddenly accelerates, a vehicle dynamic control system (VDC) for stably maintaining the running state of the vehicle by controlling the brake hydraulic pressure by a combination of the anti-lock brake system and the traction control system, and the like.

The electronic control brake system includes a modulator block having a plurality of solenoid valves and accumulators and a pair of pumps, an ECU mounted to cover one side of the modulator block to control electrically operated components, and a motor coupled to the other side of the modulator block to drive a pair of pumps.

The modulator block is a rectangular parallelepiped block made of aluminum, and the plurality of solenoid valves are mounted on one side thereof to substantially control braking hydraulic pressure to hydraulic brakes side. The solenoid valves are classified into NO type solenoid valves connected to an upstream side of the hydraulic brakes and NC type solenoid valves connected to a downstream side of the hydraulic brakes, which are controlled by the ECU.

The ECU has a circuit board disposed therein and is mounted so as to cover one side of the modulator block in which the solenoid valves are installed. The ECU senses the vehicle speed through the respective wheel sensors mounted on the front and rear wheels, thereby controlling the opening and closing operations of the respective solenoid valves and the motor driving.

The motor is installed on one side of the modulator block, and a rotating shaft of the motor for transmitting a rotational force extends to the modulator block. The rotating shaft is supported by a bearing provided in the motor, and a front end of the rotating shaft is composed of an eccentric portion to which a needle bearing is installed.

A small amount of oil may leak during the pumping of oil in the modulator block. The leaked oil may flow into the motor through the clearance of the bearing, which causes an electric conduction failure in the motor, resulting in malfunction of the motor.

SUMMARY

It is an aspect of the present disclosure to provide a hydraulic control apparatus of a brake system.

Additional aspects of the present disclosure will be set forth in part in the description which follows and, in part, will be obvious from the description, or may be learned by practice of the present disclosure.

In accordance with an aspect of the present disclosure, a hydraulic control apparatus of a brake system may include a modulator block having a motor bore, and a motor including a case accommodating a stator and a rotor and being coupled to the modulator block by mounting bolts, and a cover covering an opening of the case and supported on one side of the modulator block, wherein a vent hole for air flow between the inside and the outside of the motor is formed on the cover, and a communication passage for communicating the motor bore and the vent hole is formed in the modulator block.

A pass groove to form an air movement path that may be connected to the communication passage between the modulator block and the cover may be formed on a support surface of the cover supported on one side of the modulator block.

The vent hole may be positioned on the pass groove.

The cover may be provided with an oil receiving portion to store oil flowing out through the communication passage and the pass groove may communicate with the oil receiving portion.

The communication passage may include a first vertical bore positioned directly above the oil receiving portion and a first horizontal bore connecting the first vertical bore and the motor bore.

The oil receiving portion may be provided in a concave shape on the support surface of the cover.

A cylindrical partition wall surrounding a front bearing may be formed at a central portion of the cover and the pass groove may be formed in a shape of arc extending along an edge of the cylindrical partition wall.

The communication passage may further include a second vertical bore positioned directly above the vent hole and a second horizontal bore connecting the second vertical bore and the motor bore.

A fence portion extending along the periphery of a shaft hole through which a rotating shaft of the motor passes, a seat part extending along an inner circumference of the partition wall to support the front bearing, and a groove portion formed concavely between the seat portion and the fence portion and connected to the oil receiving portion may be provided at a central portion of the cover.

When the motor is mounted on the modulator block, the oil receiving portion may be positioned at a lower portion of the cover with respect to a center axis of the cover, and the vent hole may be positioned at an upper portion of the cover with respect to the center axis of the cover.

The modulator block may include a bearing bore on which a front bearing is supported, gaps may be formed between the cover and the modulator block to allow deformation of the cover when the motor is supported by the modulator block, and a seat portion for seating the front bearing and pressing the front bearing to the bearing bore by deformation of the cover generated by fastening of the mounting bolts may be provided at a central portion of the cover.

A step on which the cover is seated may be provided on an inner circumference of an upper end of the case, and a flange which is seated and supported on the step to receive a fastening force of the mounting bolts may be provided on an outer circumference of the cover.

The cover may include a first surface formed along a circumferential direction at a position adjacent to the outer circumference of the cover and a second surface protruding higher than the first surface, which face the modulator block.

The gaps may include a first gap formed between the flange and the modulator block and a second gap formed between the modulator block and the surface of the cover to be relatively smaller than the first gap.

The first surface and the surface of the flange may be disposed on the same plane so as not to have a step.

A partition wall surrounding an outer surface of the front bearing may be formed at the central portion of the cover.

The modulator block may be provided with a partition wall bore on which the partition wall is supported.

The partition wall bore may protrude relatively higher than the second surface.

The cover may include a restricting portion extending from the cover to be in contact with the stator installed in the case so as to restrict the up-and-down movement of the stator in the case.

A plurality of the restraining portions may be provided to contact different regions of the stator.

The restricting portion may include a first restricting portion having a ¬-shaped surface in contact with the stator and a second restricting portion having a T-shaped surface in contact with the stator.

A plurality of the stators may be disposed to be spaced apart from each other in a circumferential direction of the case, and the circumferential movement of the stators may be restrained by an embossing portion protruding between the plurality of stators at the inner wall of the case.

A plurality of the stators may be disposed to be spaced apart from each other in a circumferential direction of the case, and the circumferential movement of the stators may be restrained by a clip inserted into a gap between the plurality of stators.

The hydraulic control apparatus may further include a needle bearing disposed in the motor bore to contact pump pistons accommodated in the modulator block, wherein upper and lower portions of the needle bearing with respect to the center line of the needle bearing may be formed to be different in hardness, and a center axis of the pump pistons may be located at a portion having a relatively high hardness with respect to the center line of the needle bearing.

A reinforcing member for reinforcing the strength may be provided on an inner upper portion or an inner lower portion of the needle bearing, and the center axis of the pump pistons may be positioned to be biased toward the inner upper portion or the inner lower portion of the needle bearing in which the reinforcing member is positioned.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

Figure 1:
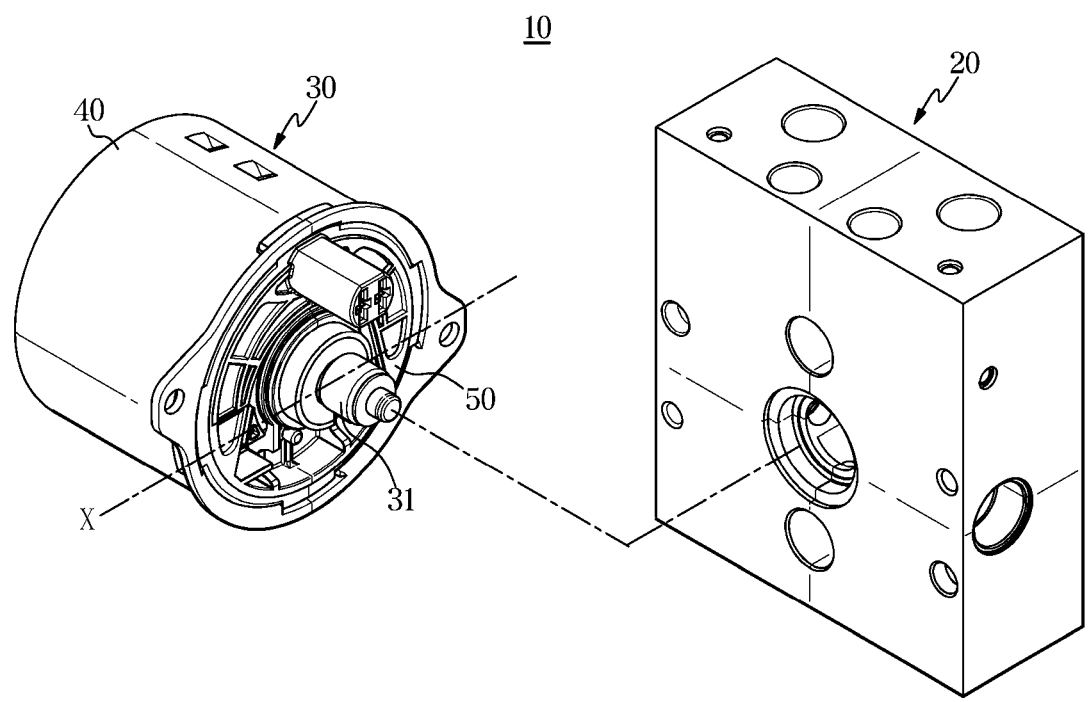
FIG. 1 is an exploded perspective view of a hydraulic control apparatus of a brake system according to an embodiment of the present disclosure.

Hereinafter, embodiments of the present disclosure will be described in detail with reference to the accompanying drawings. The embodiments described below are provided by way of example so that those skilled in the art may be able to fully understand the spirit of the present disclosure. The present disclosure is not limited to the embodiments described below, but may be embodied in other forms. In order to clearly illustrate the present disclosure, parts not related to the description are omitted from the drawings, and the size of the components may be slightly exaggerated to facilitate understanding. Like reference numerals refer to like elements throughout this specification.

Figure 2:
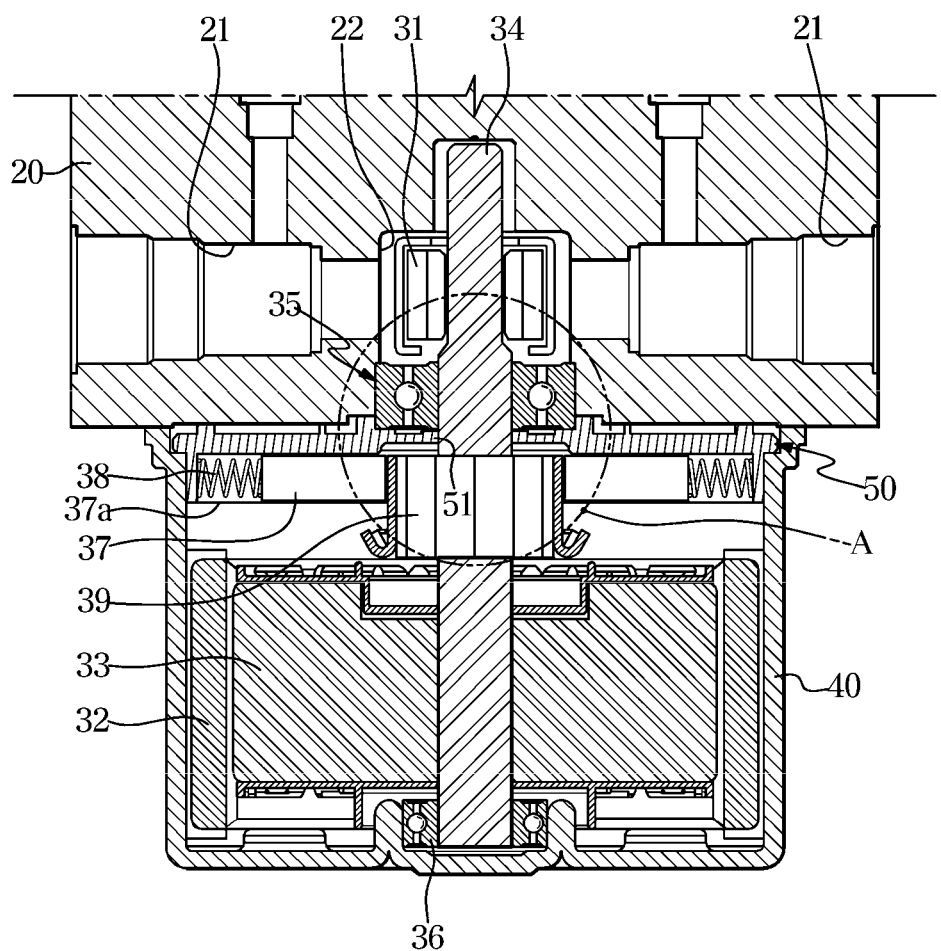
FIG. 2 is a cross-sectional view of a hydraulic control apparatus of a brake system according to an embodiment of the present disclosure.

FIG. 1 is an exploded perspective view of a hydraulic control apparatus of a brake system according to an embodiment of the present disclosure, and FIG. 2 is a cross-sectional view of a hydraulic control apparatus of a brake system according to an embodiment of the present disclosure.

Referring to FIGS. 1 and 2, a hydraulic control apparatus 10 of a brake system according to an embodiment of the present disclosure includes a plurality of solenoid valves for controlling braking hydraulic pressure, a modulator block 20 in which accumulators and a pair of pumps are installed, an ECU housing mounted to cover one side surface of the modulator block 20, and a motor 30 coupled to the other side surface of the modulator block 20 to drive the pair of pumps.

The modulator block 20, which is a rectangular parallelepiped block, is equipped with the plurality of solenoid valves therein to control the braking hydraulic pressure, and the plurality of solenoid valves are opened and closed in accordance with the control operation of an ECU to control the braking hydraulic pressure transmitted to hydraulic brakes side.

The modulator block 20 is provided with pump mounting bores 21 for mounting the pair of pumps symmetrically on opposite sides of the modulator block 20, and the pump mounting bores 21 are provided with pistons that reciprocate linearly to compress and pump oil.

Between the pair of pump mounting bores 21 formed in the modulator block 20 is formed a motor bore 22 in which a needle bearing 31 for operating the pistons by the drive of the motor 30 is located.

The motor 30 may be mounted on one side of the modulator block 20 by mounting bolts.

The motor 30 includes a case 40 having a cylindrical shape with an opening on one side, and a cover 50 mounted on the case 40 to cover the opening of the case 40.

A stator 32 and a rotor 33 that rotates in cooperation with the stator 32 are installed in the case 40, and the rotor 33 is provided with a rotating shaft 34 which is press-fitted in an axial direction at a central portion of the rotor and rotates together with the rotor 33 and has an eccentric portion at an end thereof.

The rotating shaft 34 protrudes through the shaft hole 51 formed at a central portion of the cover 50, and the eccentric portion of the rotating shaft 34 is located in the motor bore 22 when the motor 30 is mounted on the modulator block 20.

The needle bearing 31 for driving the pistons provided in the pump mounting bores 21 is coupled to the eccentric portion of the rotating shaft 34.

A front bearing 35 is installed at the central portion of the cover 50 to support the rotating shaft 34 so that the rotating shaft 34 may rotate smoothly, and a rear bearing 36, which rotatably supports one end of the rotating shaft 34, is provided at a central portion of the bottom of the case 40.

The case 40 is provided with a brush 37 whose one end is elastically supported by a spring 38 provided on a brush holder 37a and whose other end is in contact with a commutator 39.

When the rotating shaft 34 is rotated by the driving of the motor 30, the needle bearing 31 coupled to the rotating shaft 34 reciprocates the piston of the pumps installed in the pump mounting bore 21 to pump the oil.

Meanwhile, a temperature difference occurs between the inside of the case 40 and the inside of the modulator block 20 due to the heat generated when the motor 30 drives, and the oil leaking from the pumps through the front bearing 35 or the gap between the front bearing 35 and the cover 50 by a pressure difference due to the temperature difference may be introduced into the case 40. This may lead to an electric conduction failure between the brush 37 and the commutator 39, which may cause problems in motor driving.

To solve this problem, the hydraulic control apparatus 10 of a brake system of the present embodiment may include an air circulation structure for eliminating the temperature difference between the inside of the modulator block 20 and the inside of the case 40.

Figure 3:
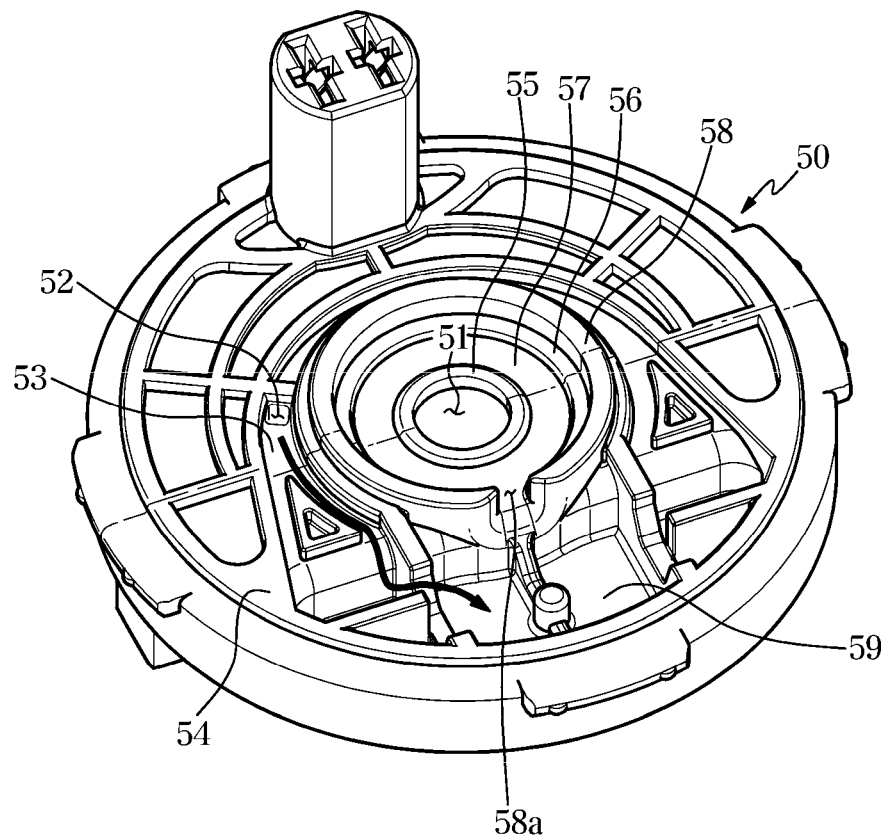
FIG. 3 is a perspective view of a cover of a motor of a hydraulic control apparatus according to an embodiment of the present disclosure.
Figure 4:
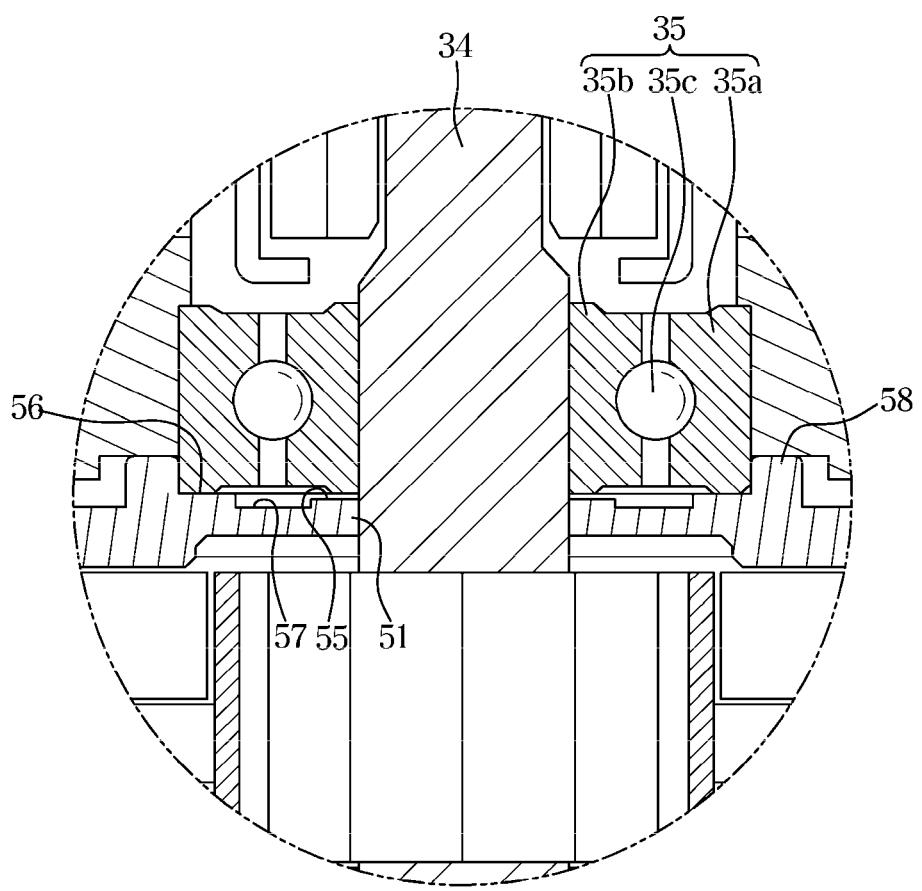
FIG. 4 is an enlarged view of a portion indicated by "A" in FIG. 2.
Figure 5:
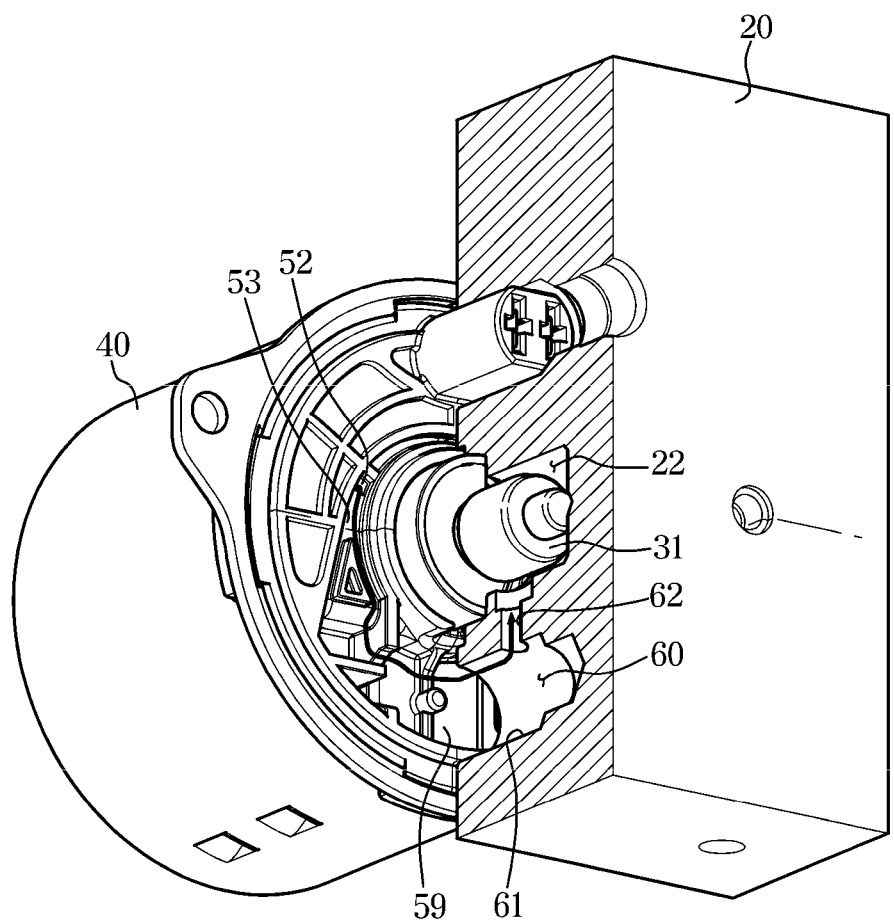
FIG. 5 is a cutaway view of a part of a hydraulic control apparatus according to an embodiment of the present disclosure.

FIG. 3 is a perspective view of a cover of a motor of a hydraulic control apparatus according to an embodiment of the present disclosure, FIG. 4 is an enlarged view of a portion indicated by "A" in FIG. 2, and FIG. 5 is a cutaway view of a part of a hydraulic control apparatus according to an embodiment of the present disclosure.

Referring to FIGS. 3 to 5, in order to form an air flow between the inside of the modulator block 20 and the inside of the case 40, a vent hole 52 for communicating the inside and outside of the case 40 may be formed in the cover 50 mounted to cover the opening of the case 40, and a communication passage 60 for communicating between the vent hole 52 and the motor bore 22 may be formed in the modulator block 20.

The cover 50 may also include a pass groove 53 to form a flow passage for communicating the vent hole 52 and the communication passage 60 between the modulator block 20 and the cover 50.

Accordingly, when the motor 30 is mounted on the modulator block 20, the air inside the case 40 may be discharged to the outside of the case 40 through the vent hole 52 formed in the cover 50 and flow through the pass groove 53 formed between the modulator block 20 and the cover 50, and then flow into the motor bore 22 through the communication passage 60.

The pass groove 53 forming an air movement path between the modulator block 20 and the cover 50 may be formed to be recessed in a support surface 54 of the cover 50 supported on one side of the modulator block 20.

A shaft hole 51 through which the rotating shaft 34 of the motor 30 passes is formed at the central portion of the cover 50, and the front bearing 35 may be seated around the shaft hole 51.

A fence portion 55 extending along the periphery of the shaft hole 51, a seat portion 56 supporting the front bearing 35, and a groove portion 57 formed concavely between the fence portion 55 and the seat portion 56 may be formed around the shaft hole 51.

An outer ring 35a of the front bearing 35 is supported on the seat portion 56. The outer ring 35a of the front bearing 35 is surrounded by a partition wall 58 extending upwardly along an outer edge of the seat portion 56.

The seat portion 56 is located at a position facing the outer ring 35a of the front bearing 35, the fence portion 55 is located at a position facing an inner ring 35b of the front bearing 35, and the groove portion 57 is located at a position facing a ball member 35c of the front bearing 35.

The fence portion 55 is provided to have a lower height than the seat portion 56 so that the inner ring 35b of the front bearing 35 may rotate. The groove portion 57 is provided to be recessed between the seat portion 56 and the fence portion 55 so that the oil leaking through the ball member 35c remains in the groove portion 57, thereby preventing the oil from being introduced into the case 40 through the shaft hole 51.

At one side of the support surface 54 of the cover 50, an oil receiving portion 59 for storing the leaked oil may be formed to have a concave shape.

The oil receiving portion 59 may be positioned below an outlet 58a formed at one side of the partition wall 58 by cutting the partition wall 58 to a predetermined size.

The pass groove 53 may be formed to extend along a circumferential direction on the outside of the partition wall 58 and to be in a concave shape on the support surface 54 of the cover 50.

The pass groove 53 may be formed in an arc shape and the vent hole 52 may be positioned on one side of the bottom of the pass groove 53.

When the motor 30 is mounted on the modulator block 20, the vent hole 52 may be positioned above the oil receiving portion 59 with respect to an axis x (refer to FIG. 1) passing through the center of the cover 50.

The pass groove 53 may be provided to communicate with the oil receiving portion 59 provided in the cover 50. Thus, the air in the case 40 flowing out through the vent hole 52 may flow along the pass groove 53 and then be introduced into the oil receiving portion 59.

The communication passage 60 formed in the modulator block 20 may be positioned above the oil receiving portion 59 so as to communicate with the oil receiving portion 59.

The communication passage 60 includes a first vertical bore 61 positioned directly above the oil receiving portion 59, and a first horizontal bore 62 connecting the first vertical bore 61 and the motor bore 22.

The communication passage 60 including the first vertical bore 61 and the first horizontal bore 62 allows the air flow between the motor bore 22 and the oil receiving portion 59 while functioning as a passage for allowing the oil, which leaks to the motor bore 22 side during the pump operation, to fall into the oil receiving portion 59 provided in the cover 50.

With this configuration, as the inside of the case 40 of the motor 30 and the inside of the motor bore 22 communicate with each other through the vent hole 52, the pass groove 53, the oil receiving portion 59, and the communication passage 60 as shown by arrows in FIGS. 3 and 5 to circulate air, a temperature difference between the inside of the case 40 and the inside of the motor bore 22 is eliminated, so that the inflow of oil into the case 40 due to a pressure difference between the two spaces may be reduced.

The modulator block 20 may further include a communication passage for smooth air circulation between the inside of the case 40 and the inside of the motor bore 22.

Figure 6:
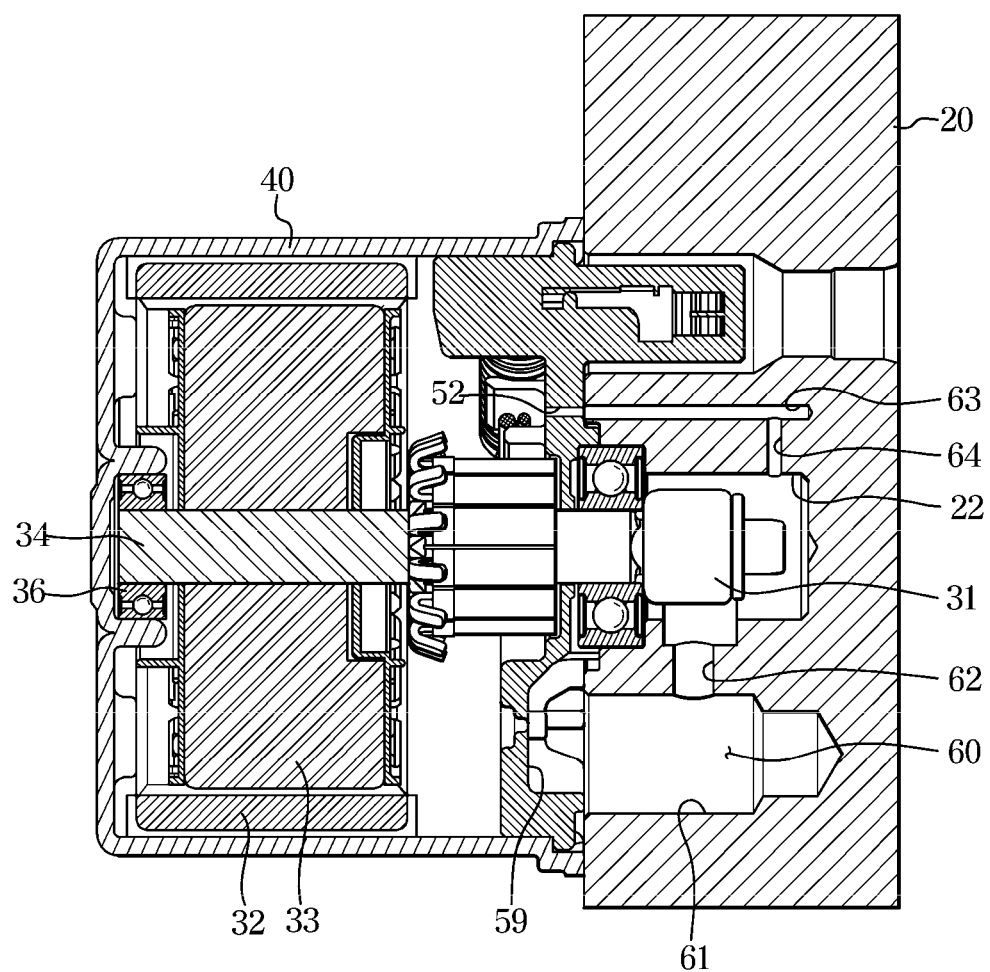
FIG. 6 is a cross-sectional view illustrating a communication passage provided in a modulator block of a hydraulic control apparatus according to another embodiment of the present disclosure.
Figure 7:
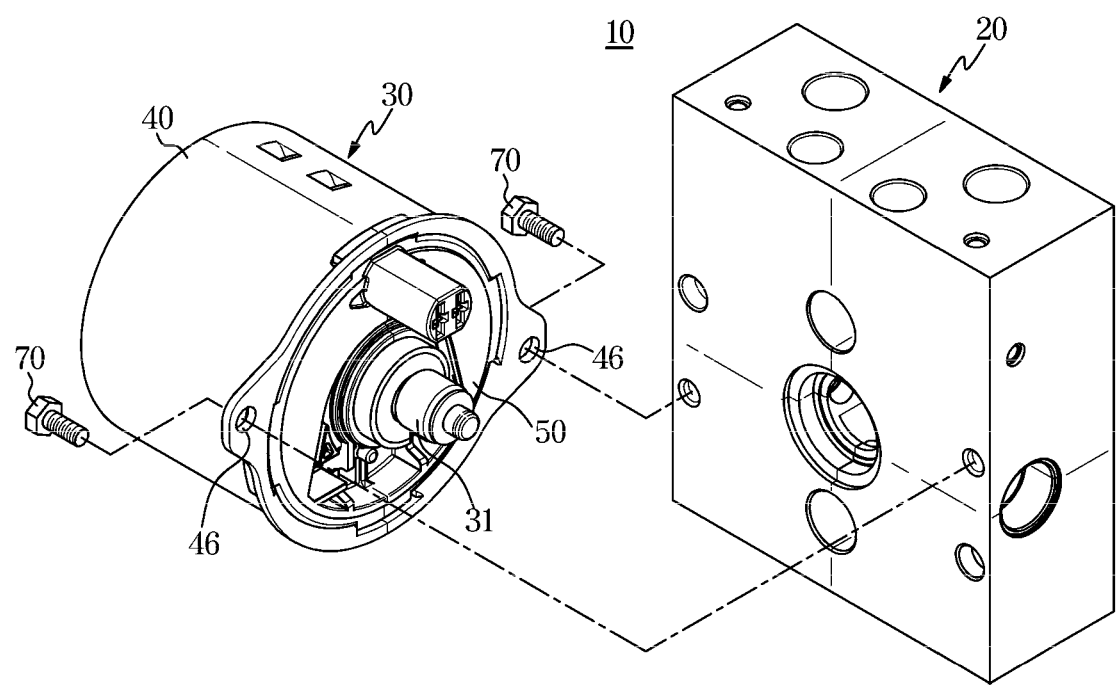
FIG. 7 is an exploded perspective view of a hydraulic control apparatus of a brake system according to another embodiment of the present disclosure.
Figure 8:
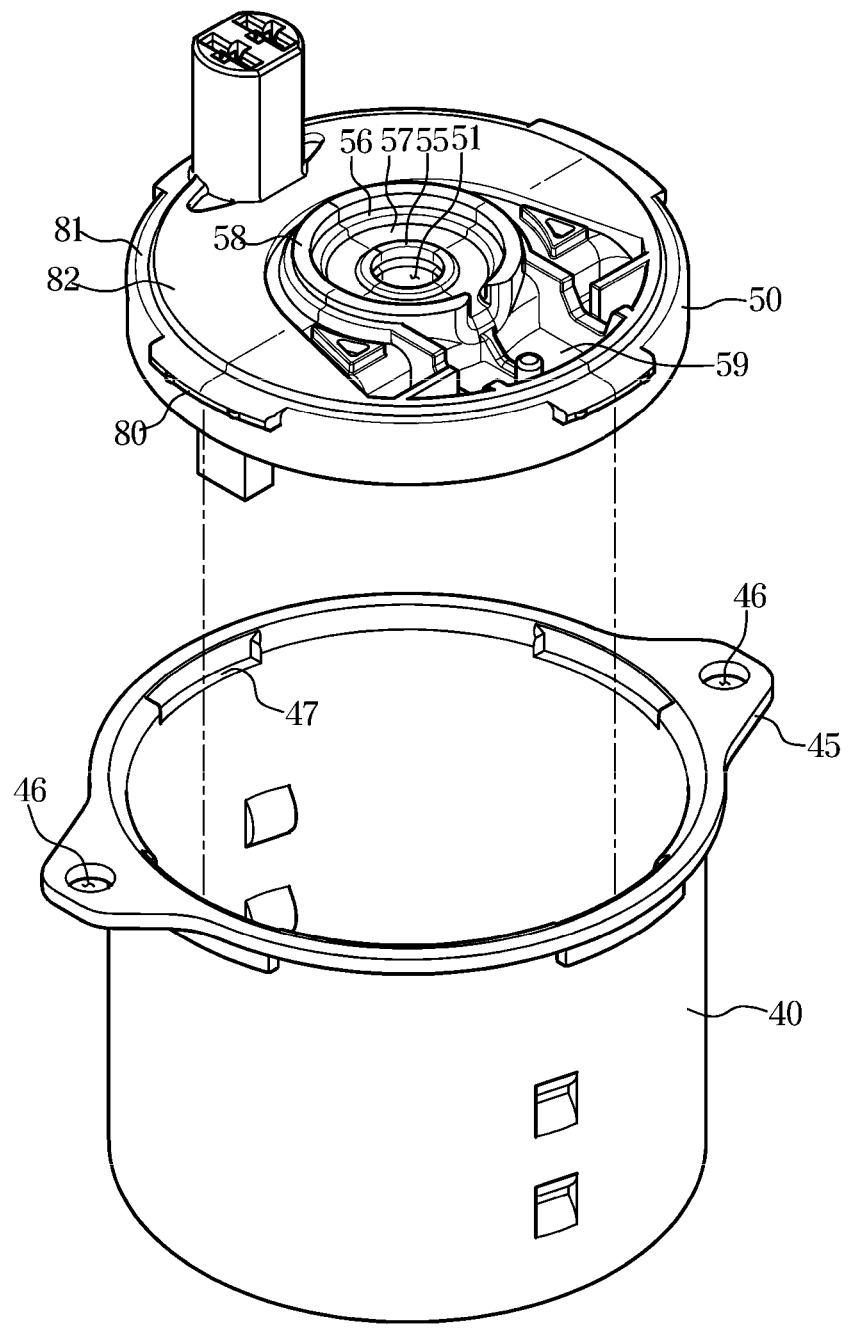
FIG. 8 is a perspective view illustrating a coupling relationship between a cover and a case of a motor according to another embodiment of the present disclosure.
Figure 9:
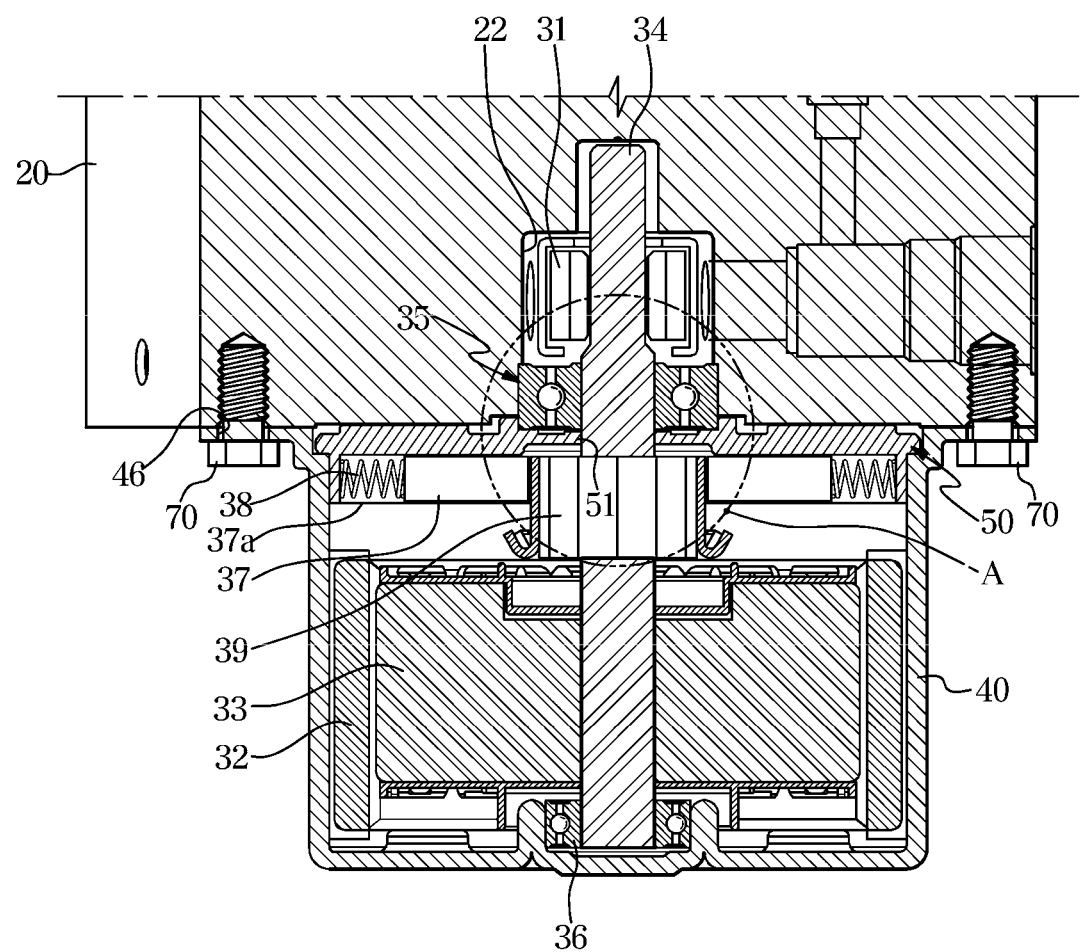
FIG. 9 is a cross-sectional view of a hydraulic control apparatus of a brake system according to another embodiment of the present disclosure.
Figure 10:
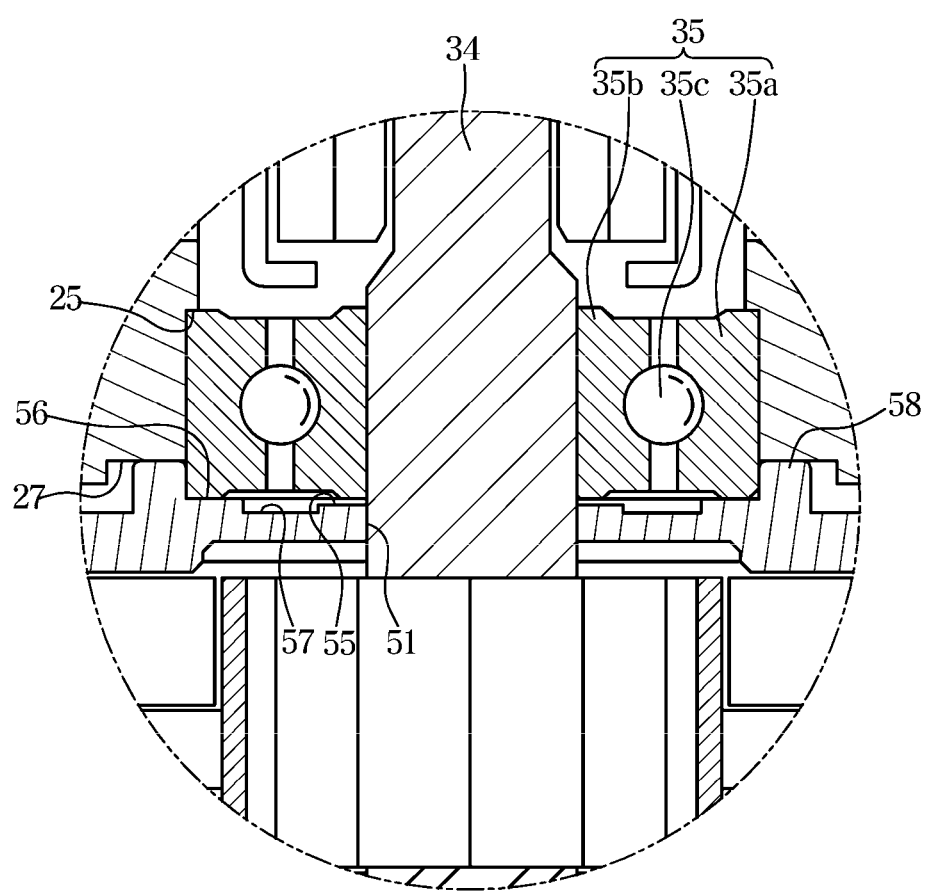
FIG. 10 is an enlarged view of a portion indicated by "A" in FIG. 9.

FIG. 6 is a cross-sectional view illustrating a communication passage provided in a modulator block of a hydraulic control apparatus according to another embodiment of the present disclosure. Hereinafter, the same reference numerals are assigned to components having the same function, and a detailed description thereof will be omitted.

The communication passage 60 formed in the modulator block 20 may further include a second vertical bore 63 positioned directly above the vent hole 52, and a second horizontal bore 64 connecting the second vertical bore 63 and the motor bore 22.

Thus, the inside of the motor bore 22 may communicate with the inside of the case 40 though a first air movement path via the first horizontal bore 62, the first vertical bore 61, the oil receiving portion 59, the pass groove 53, and the vent hole 52, and a second air movement path via the second horizontal bore 64, the second vertical bore 63, and the vent hole 52.

In this case, the position of the vent hole 52 formed in the cover 50 and the shape of the pass groove 53 may be appropriately changed in accordance with the position of the communication passage.

With this configuration, the present embodiment may prevent the oil leaking from the pumps side of the modulator block from flowing into the motor, thereby preventing the motor failure and improving the overall product reliability of the brake system.

Hereinafter, a hydraulic control apparatus according to another embodiment of the present disclosure will be described. Hereinafter, the same reference numerals are assigned to components having the same function, and a detailed description thereof will be omitted.

Referring to FIGS. 7 to 10, the motor 30 of the present embodiment may be mounted on the modulator block 20 through the mounting bolts 70.

A fastening flange 45, which extend outwardly and has fastening holes 46 for fastening the mounting bolts 70, may be provided symmetrically on opposite sides of the case 40 at an upper end portion of the case 40.

When the motor 30 is mounted on the modulator block 20, upper and lower end portions of the outer ring 35a of the front bearing 35 are firmly supported by a bearing bore 25 and the seat portion 56, respectively, so that the movement of the outer ring 35a may be prevented.

The seat portion 56 functions to presses the front bearing 35 toward the bearing bore 25 by a fastening force of the mounting bolts 70 when the case 40 is coupled to the modulator block 20 by the mounting bolts 70.

The cover 50 may be coupled to the case 40 by being press-fitted into the opening of the case 40.

To this end, a step 47 on which the cover 50 is seated may be provided on an inner circumference of the upper end of the case 40, and a flange 80 which is seated and supported on the step 47 may protrude outward from an outer circumference of the cover 50.

A plurality of the flanges 80 may be provided to be spaced apart from each other by a predetermined distance along a circumferential direction of the cover 50, and the case 40 may be provided with the number of the steps 47 corresponding to the number of the flanges 80.

The step 47 provided in the case 40 transmits the fastening force of the mounting bolts 70 to the flange 80 of the cover 50 when the motor 30 is mounted by the mounting bolts 70.

The cover 50 includes a first surface 81 formed along the circumferential direction at a position adjacent to an outer circumference of the cover 50 and a second surface 82 protruding higher than the first surface 81 in the inward direction of the first surface 81, which face the modulator block 20 when the motor 30 is mounted on the modulator block 20.

The first surface 81 may be coplanar with the surface of the flange 80 so as not to have a step with the flange 80.

When the motor 30 is temporarily assembled to the modulator block 20 (a support state before the mounting bolts are fastened), the first surface 81 and the second surface 82 formed on the cover 50 may be positioned so as not to contact the surface facing the modulator block 20.

Figure 11:
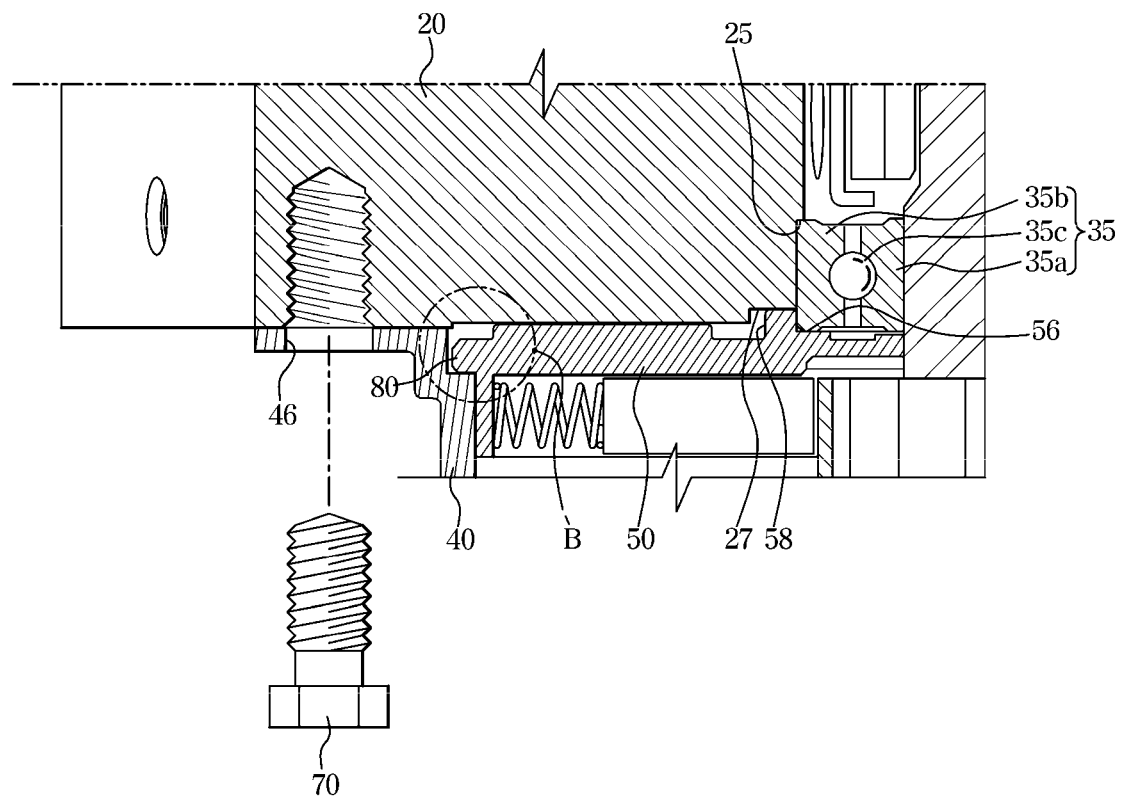
FIG. 11 is a cross-sectional view illustrating a state in which a motor is supported in a modulator block before fastening of mounting bolts according to another embodiment of the present disclosure.
Figure 12:
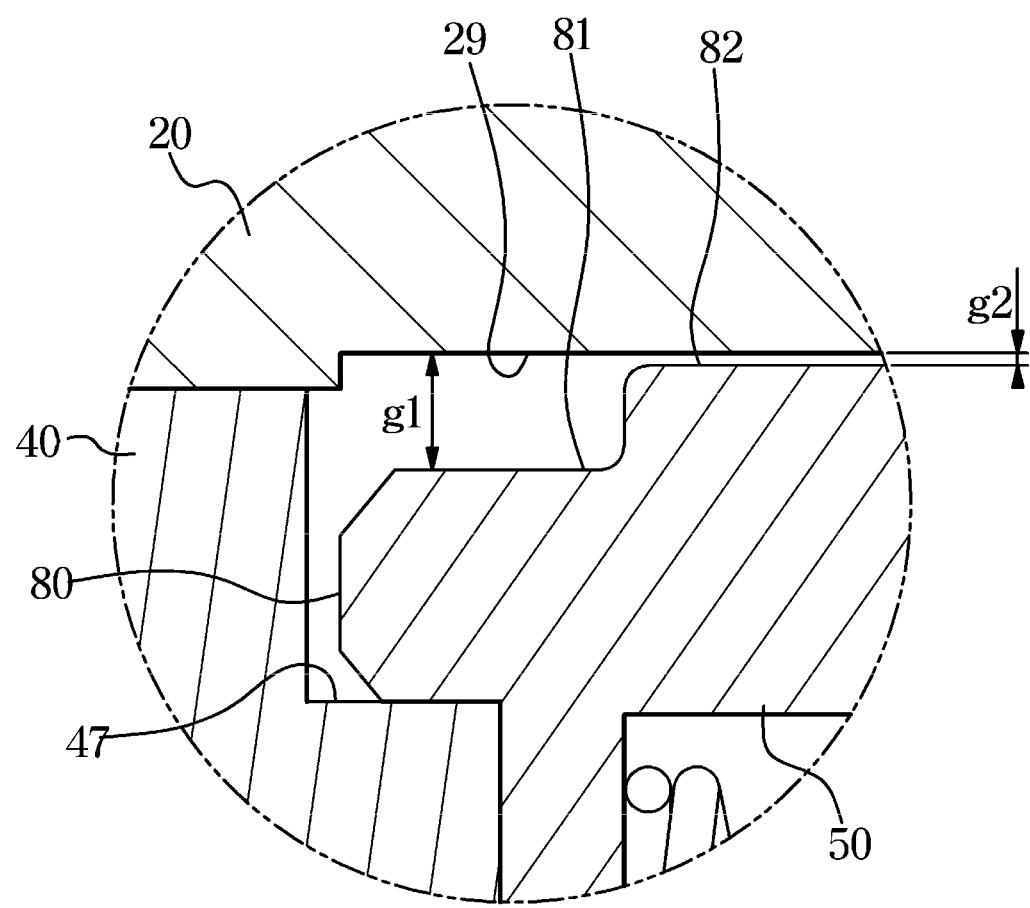
FIG. 12 is an enlarged view of a portion indicated by "B" in FIG. 11.
Figure 13:
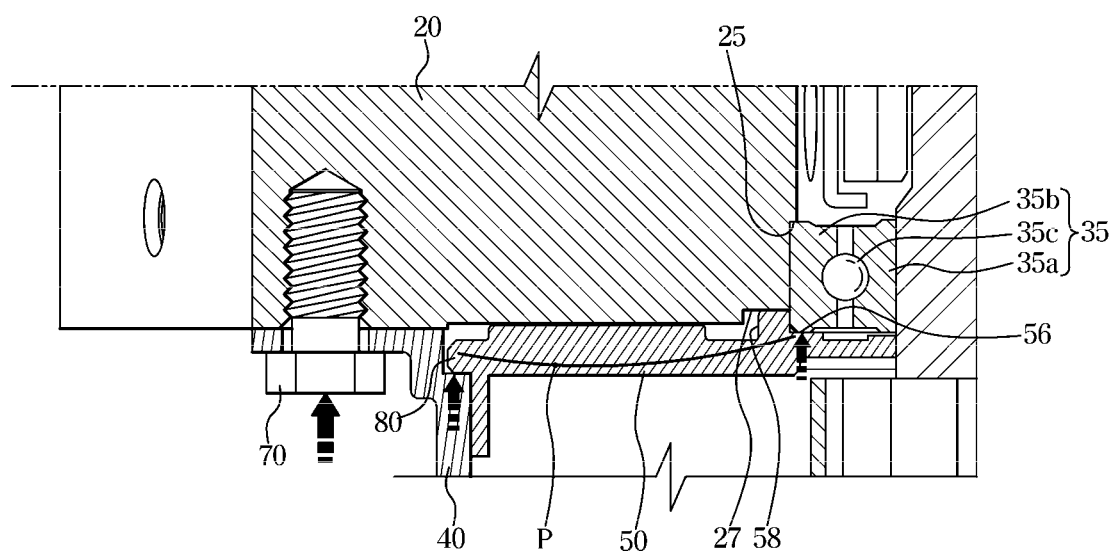
FIG. 13 is a cross-sectional view illustrating a deformed state of a cover by fastening of mounting bolts according to another embodiment of the present disclosure.
Figure 14:
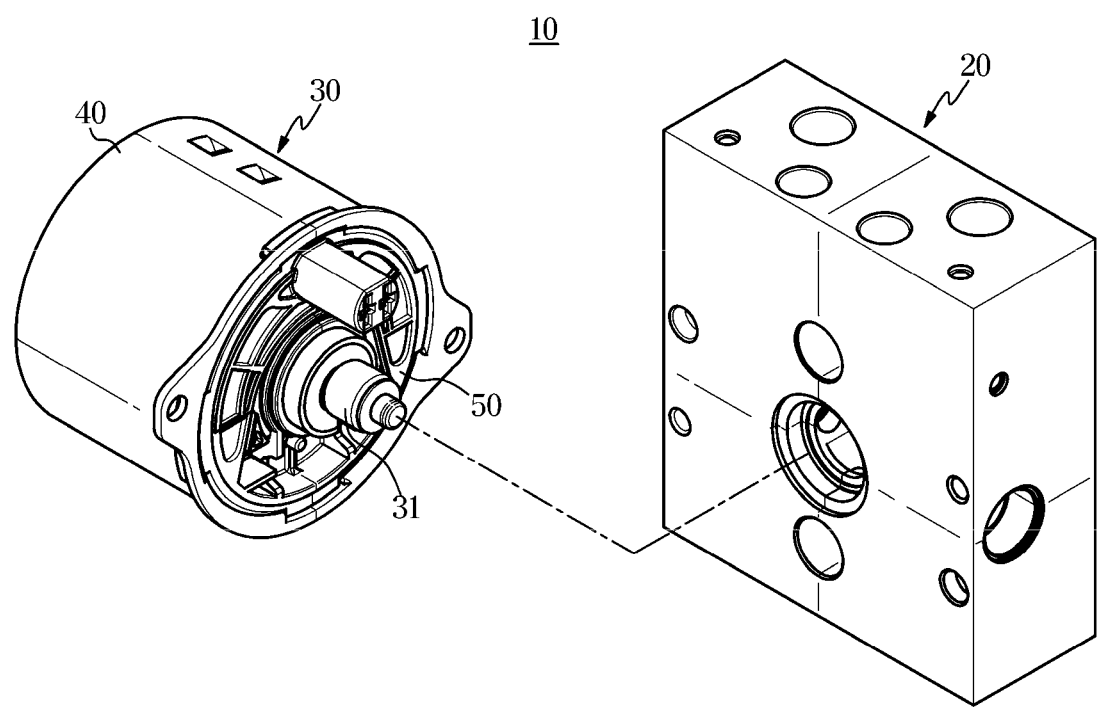
FIG. 14 is an exploded perspective view of a hydraulic control apparatus according to another embodiment of the present disclosure.
Figure 15:
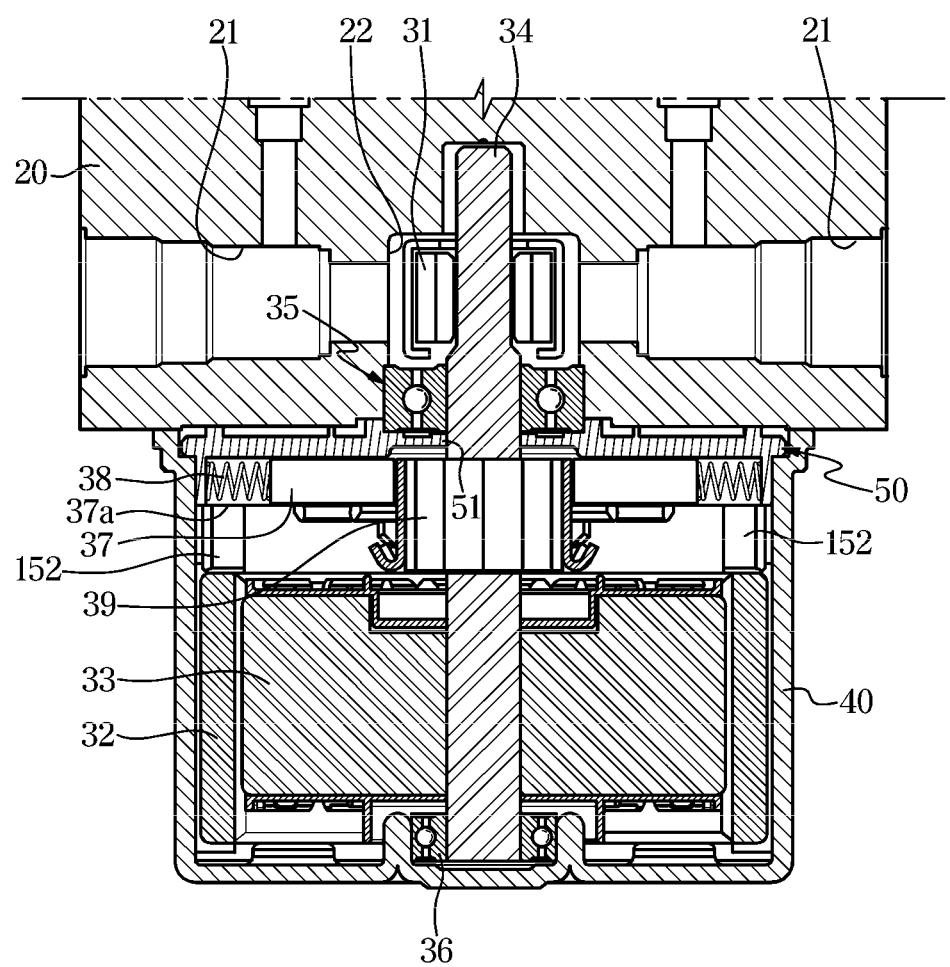
FIG. 15 is a cross-sectional view of a hydraulic control apparatus according to another embodiment of the present disclosure.
Figure 16:
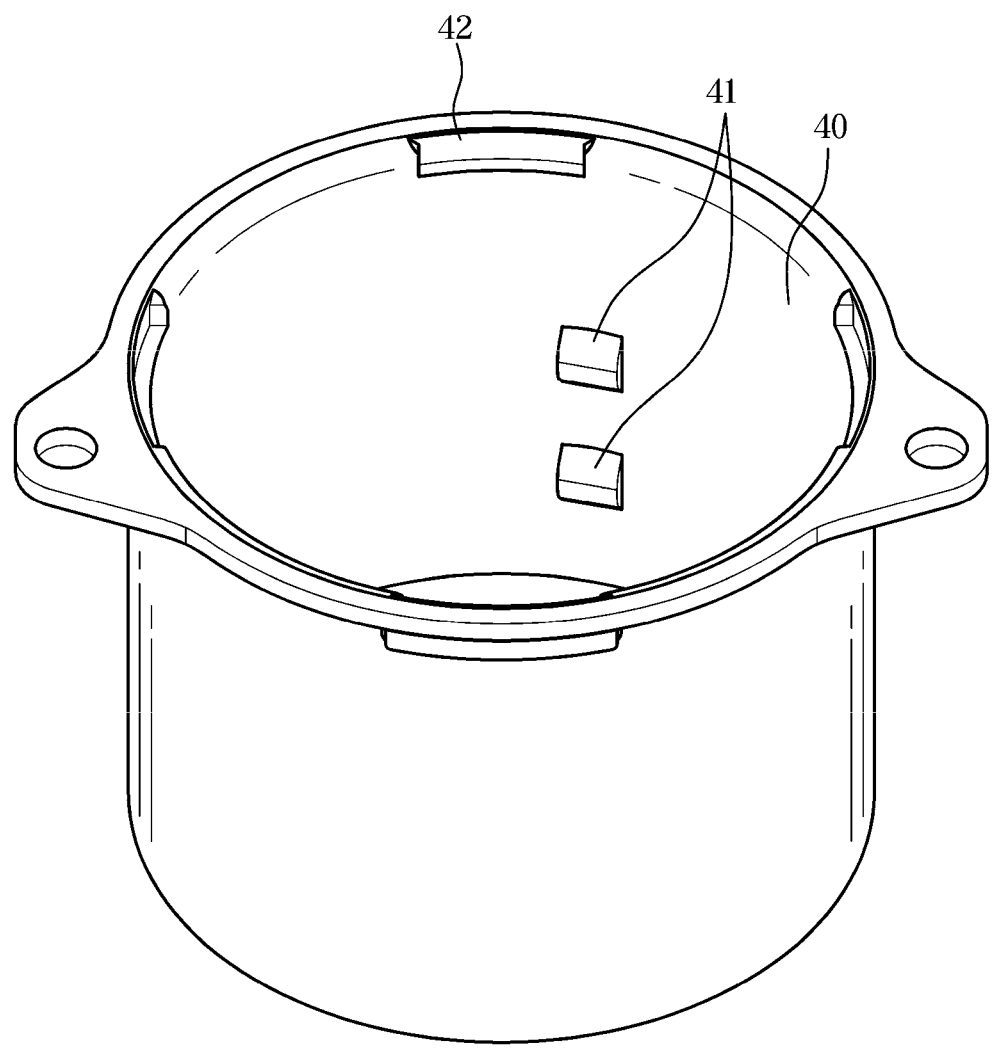
FIG. 16 is a perspective view of a case of a motor of a hydraulic control apparatus according to another embodiment of the present disclosure.

Referring to FIGS. 11 to 13, when the case 40 of the motor 30 is supported on one surface 29 of the modulator block 20 in order to mount the motor 30 to the modulator block 20, gaps g1 and g2 are formed between the cover 50 and the modulator block 20 to allow the cover 50 to deform.

The gaps g1 and g2 include the first gap g1 formed between the one surface 29 of the modulator block 20 and the first surface 81 of the cover 50, and the second gap g1 formed between the one surface 29 of the modulator block 20 and the second surface 82 of the cover 50.

The first gap g1 forms a space that may allow the first surface 81 to bend when the step 47 presses the flange 80 by the fastening force of the mounting bolt 70, and the second gap g1 second gap g2 forms a space that may allow bending of the second surface 82 due to bending of the first surface 81.

At this time, an upper end portion of the outer ring 35b of the front bearing 35 is supported on the bearing bore 25 of the modulator block 20, and the lower end portion of the outer ring 35b of the front bearing 35 is supported on the seat portion 56 formed on the cover 50.

In this state, when the mounting bolt 70 is fastened to the modulator block 20 as illustrated in FIG. 13, the fastening force of the mounting bolt 70 is transmitted to the flange 80 of the cover 50 through the step 47 of the case 40 to press the first surface 81 side of the cover 50 upward, so that the cover 50 is bent like an imaginary line P.

Accordingly, the seat portion 56 supporting the lower end portion of the front bearing 35 is bent upward by the deformation of the cover 50 and the upper end portion of the front bearing 35 is pressed and supported by the bearing bore 25, so that the front bearing 35 supported by the bearing bore 25 and the seat portion 56 is prevented from moving in the axial direction.

With this configuration, the present embodiment may prevent the front bearing 35 from moving up and down when the motor is driven. Therefore, the present embodiment may prevent the malfunction of the motor from being caused by the friction between the bearing and the modulator block supporting the bearing by the up-and-down movement of the bearing supporting the rotating shaft when the axial movement of the rotating shaft occurs due to the driving of a conventional motor.

Hereinafter, a hydraulic control apparatus according to another embodiment of the present disclosure will be described. Hereinafter, the same reference numerals are assigned to components having the same function, and a detailed description thereof will be omitted.

Referring to FIGS. 14 to 19, a hydraulic control apparatus according to the present embodiment restrains the stator 32 from moving up and down within the case 40 by the cover 50 covering the opening of the case 40.

The cover 50 is provided on a facing surface of the case 40 and may include restricting portions 152 and 153 whose ends are in contact with the stator 32.

The restricting portions 152 and 153 may include a pair of the first restricting portions 152 provided on opposite sides of the edge of the circular cover 50 and having one surface of a '¬' shape in contact with the stator 32, and the second restricting portion 153 disposed between the first restricting portions 152 along the edge of the cover 50 and having one surface of a 'T' shape in contact with the stator 32. The first restricting portions 152 and the second restricting portion 153 may support the upper surface of each of the stators 32 that are seated along the inner wall of the case 40, so that the first restricting portions 152 and the second restricting portion 153 may restrain the stators 32 from the upper and lower portions together with the bottom surface of the case 40.

Guide portions 154 of the cover 50 may be inserted into insertion portions 42 of the case 40 to guide the direction and position in which the cover 50 is inserted into the case 40.

A plurality of the stators 32 are arranged to be spaced apart from each other by a predetermined distance in the circumferential direction and embossing portions 41 or clips 160 are inserted between the stators 32 so that the lateral movement of the stators 32 may be restrained.

Figure 17:
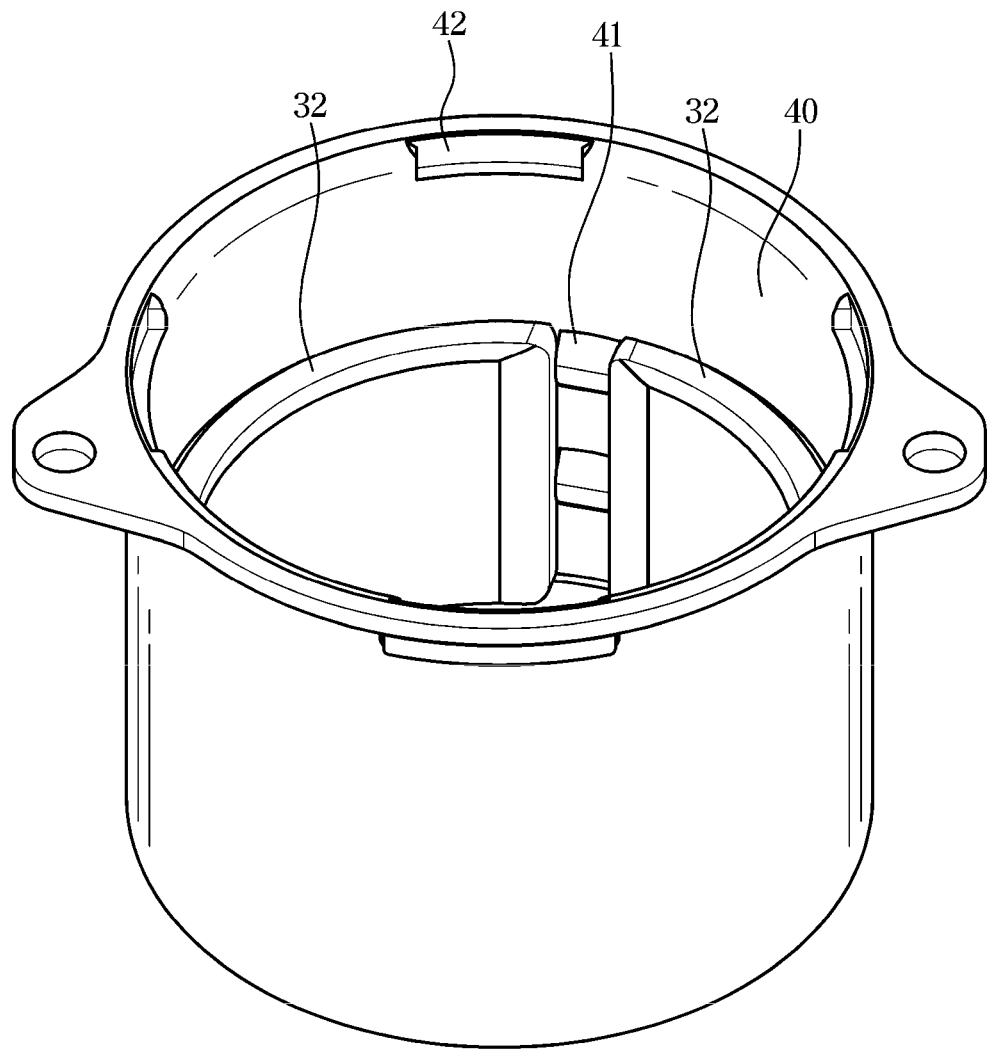
FIG. 17 is a perspective view illustrating a state in which a stator is installed in a case of a motor according to another embodiment of the present disclosure.
Figure 18:
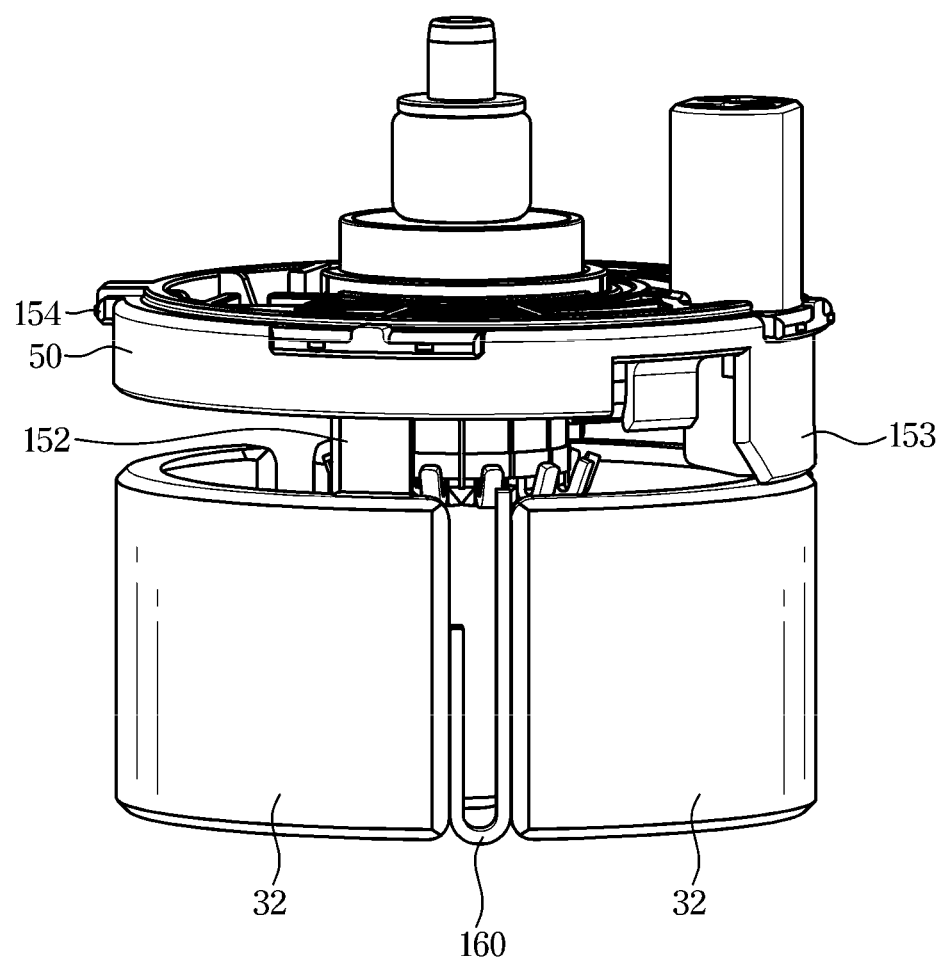
FIG. 18 is a view illustrating a state in which a case is removed from a motor according to another embodiment of the present disclosure.
Figure 19:
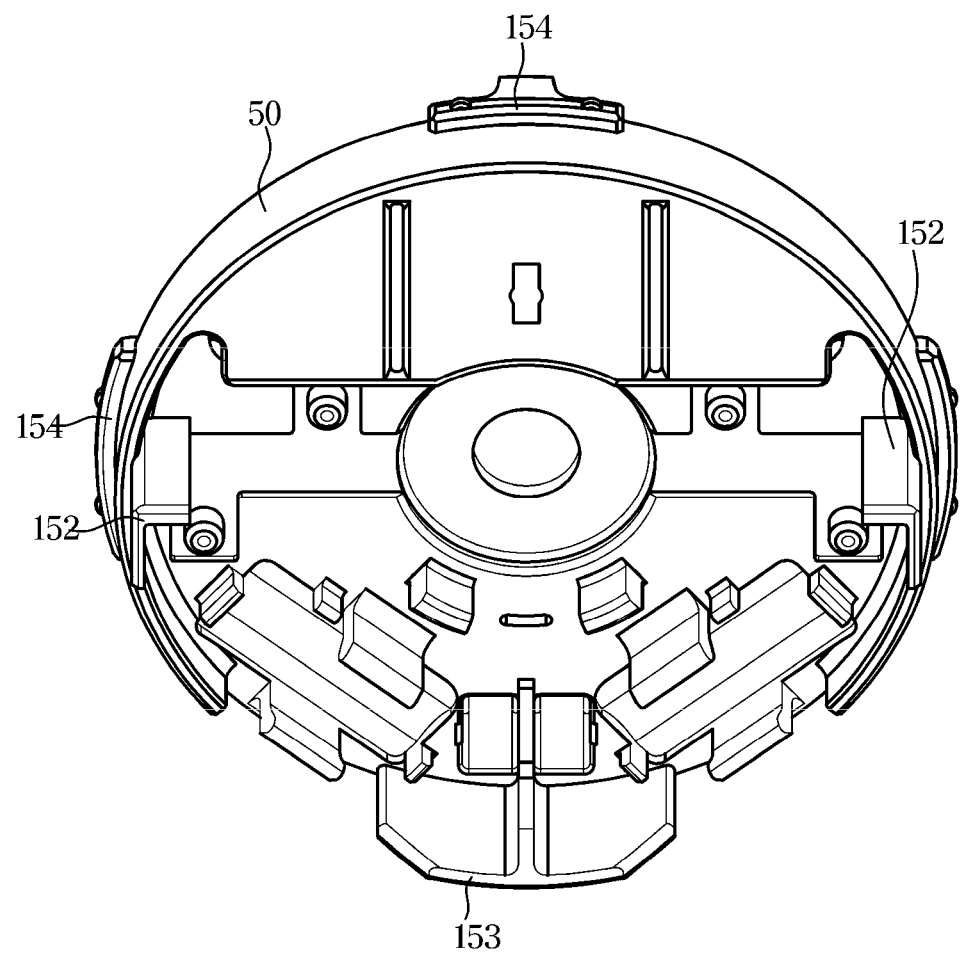
FIG. 19 is a bottom perspective view of a cover of a motor according to another embodiment of the present disclosure.

FIG. 17 illustrates the case where the embossing portions 41 are sandwiched between the stators 32 and FIG. 18 illustrates the case where the clips 160 are sandwiched between the stators 32.

As an example, the three stators 32 may be spaced apart from each other and at the same time the movement of the stator 32 in the circumferential direction of the case 40 may be restrained by a manner in which the three stators 32 are disposed in the circumferential direction in close contact with the inner surface of the case 40 and the one embossing portion 41 and the two clips 160 are disposed between the stators 32, respectively. In this case, the clips 160 may be provided to have one end folded in the shape of 'u' to provide an elastic force.

Therefore, the hydraulic control apparatus according to the present embodiment may restrict the movement of the stators 32 in a vertical direction by the first and second restricting portions 152 and 153 provided on the cover 50. Further, the hydraulic control apparatus according to the present embodiment may restrict the rotation of the stators 32 in the circumferential direction of the case 40 by using the clips 160 or the embossing portions 41 when the stators 32 are fastened to the case 40.

In addition, as described above, the restricting portions 152 and 153 include a pair of the first restricting portions 152 provided on opposite sides of the edge of the cover 50 having one surface of a '¬' shape in contact with the stator 32, and the second restricting portion 153 disposed between the first restricting portions 152 along the edge of the cover 50 and having one surface of a 'T' shape in contact with the stator 32, so that the vertical movement of the stators 32 may be restrained stably and efficiently.

With this configuration, the hydraulic control apparatus according to the present embodiment may be stably operated without failure or breakage for a long time by restricting the upward and downward movements of the stators housed in the case using the restricting portions provided on the cover of the motor.

Further, the hydraulic control apparatus according to the present embodiment may be further stably operated without failure or breakage for a long time by restricting the rotation of the stators in the circumferential direction of the case using the clips or the embossing portions when the stators are fastened to the case of the motor.

Hereinafter, a hydraulic control apparatus according to another embodiment of the present disclosure will be described. Hereinafter, the same reference numerals are assigned to components having the same function, and a detailed description thereof will be omitted.

Figure 20:
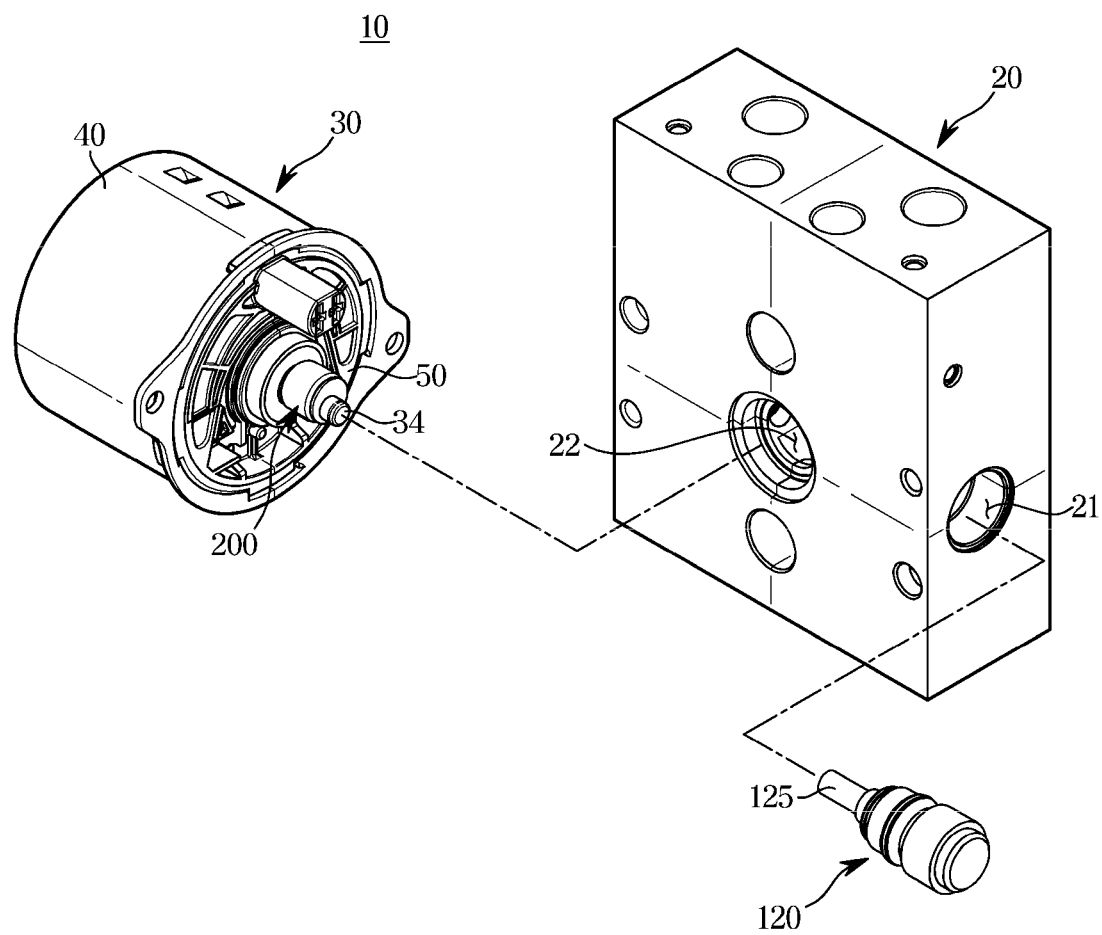
FIG. 20 is an exploded perspective view of a hydraulic control apparatus of a brake system according to another embodiment of the present disclosure.
Figure 21:
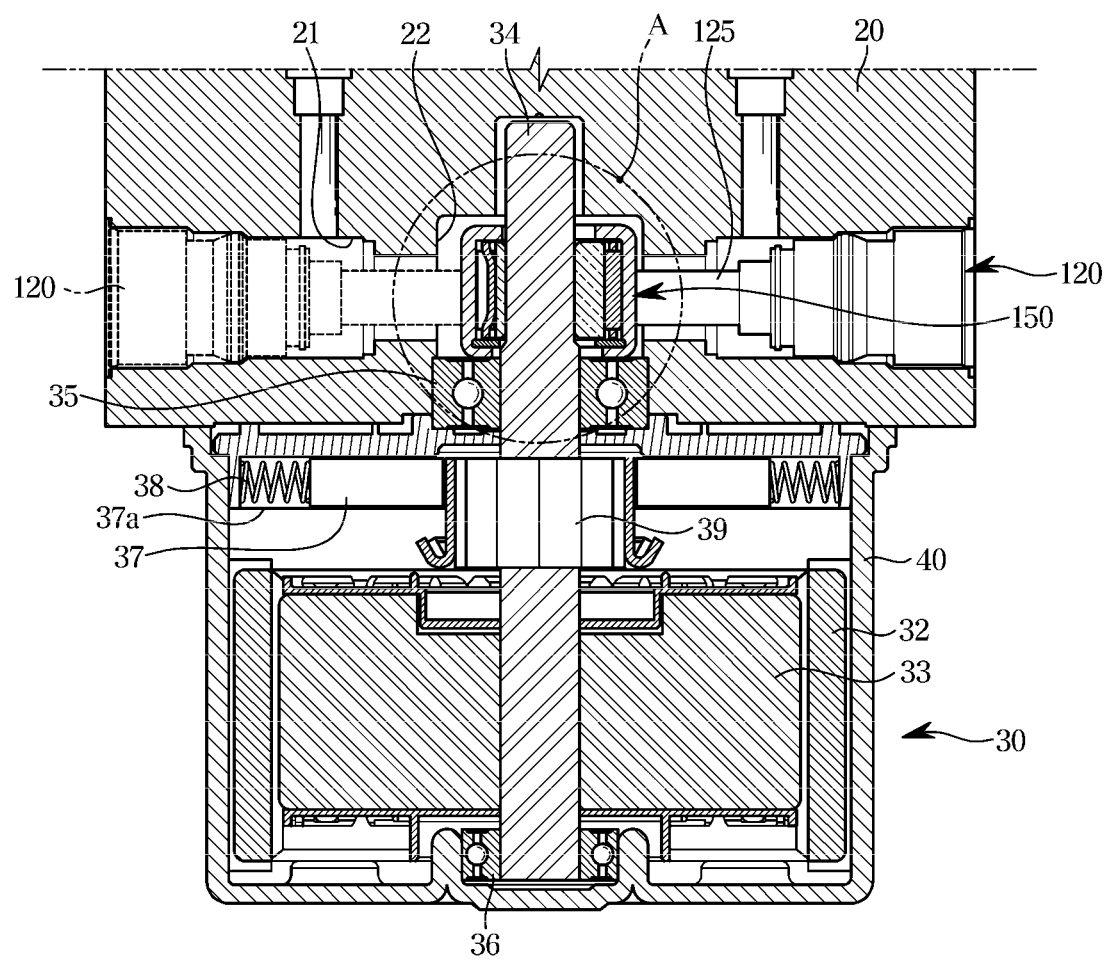
FIG. 21 is a cross-sectional view of a hydraulic control apparatus of a brake system according to another embodiment of the present disclosure.
Figure 22:
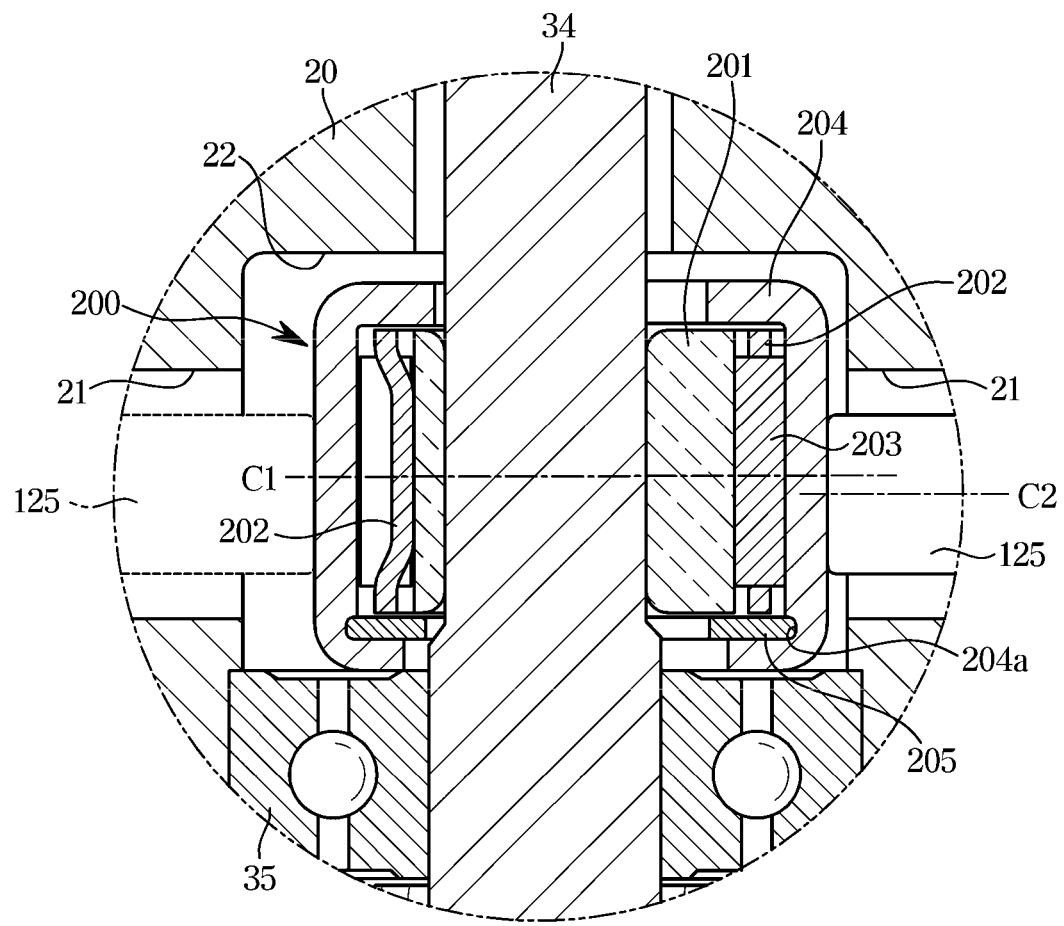
FIG. 22 is an enlarged view of a portion indicated by "A" in FIG. 21.

Referring to FIGS. 20 to 22, a pump 120 for compressing and pumping the oil by linearly reciprocating a pump piston 125 is provided in each of the pair of pump mounting bores 21 formed in the modulator block 20 of the present embodiment, and between the pair of pump mounting bores 21, a motor bore 22, in which a needle bearing 200 is located, is formed to communicate with the pump mounting bores 21 in an orthogonal manner.

Although the present embodiment illustrates that a pair of the pump mounting bores 21 are provided, the number of pump mounting bores 21 may be selectively increased, and the plurality of pump mounting bores 21 may be formed to have the same phase difference.

The needle bearing 200 mounted on the rotating shaft 34 of the motor 30 includes a ring-shaped inner ring 201 press-fitted into the rotating shaft 34, a plurality of rollers 203 rotatably supported by a retainer 202 and disposed to be spaced apart from each other by a predetermined distance along an outer periphery of the inner ring 201, and an outer ring 204 surrounding the inner ring 201 and the rollers 203 and provided to be rotatable.

The needle bearing 200 may be provided such that the hardness of either an upper portion or a lower portion of the needle bearing 200 with respect to the center thereof is higher than the other side. For example, a reinforcing member 205 for the strength reinforcement may be provided on an inner upper portion or an inner lower portion of the needle bearing 200.

The reinforcing member 205 may be provided between the inner ring 201 and the outer ring 204 in a downward direction of the needle bearing 200. Thus, the needle bearing 200 is set to have a higher hardness on the lower portion thereof than the upper portion thereof with respect to a center line C1. The reinforcing member 205 may be provided as a washer having a predetermined rigidity and the washer may be stably in close contact with the inner ring 201 by being inserted into a groove 204a formed on an inner circumferential surface of the outer ring 204.

According to an aspect of the present disclosure, a center axis C2 of the pump pistons 125 may be positioned at a side having a higher hardness with respect to the center line C1 of the needle bearing 200. This is to increase the durability by disposing the pump pistons 125 at a position where the hardness is high to minimize the wear of the needle bearing 200 because the direction and magnitude (load) of the axial component force of the inside of the needle bearing 200 are changed in accordance with the relative positions of the needle bearing 200 and the pump pistons 125.

As illustrated in FIG. 22, in a case where the hardness of a lower portion with respect to the center line C1 of the needle bearing 200 is higher than an upper portion by providing the reinforcing member 205 on the inner lower portion of the needle bearing 200, the center axis C2 of the pump pistons 125 is provided to move downward with respect to the center line C1 of the needle bearing 200.

Accordingly, when the rotating shaft 34 rotates, the needle bearing 200 coupled to the rotating shaft 34 eccentrically rotates to drive the pump pistons 125, and the wear may be minimized even by an eccentric load generated during driving and stable operation may be performed.

An embodiment of the present invention illustrates and describes that an eccentric bearing having an eccentric structure is provided for eccentrically rotating the needle bearing 200, but the present disclosure is not limited thereto. For example, an eccentric shaft which is offset from the center of the rotating shaft to the radial direction may be provided at a front end portion of the rotating shaft 34, and the needle bearing may be provided on the eccentric shaft to be eccentrically rotated.

Also, the reinforcing member 205 is provided on the needle bearing 200 so that a difference in hardness between the upper and lower portions with respect to the center line C1 of the needle bearing 200 is generated, but the present disclosure is not limited thereto. For example, a difference in hardness may be generated with respect to the center line C1 of the needle bearing 200 by varying the contact area between the outer ring 204 and the inner ring 201 in the upward or downward direction when the needle bearing 200 is manufactured. That is, as the center axis C2 of the pump pistons 125 is to be positioned in contact with the needle bearing 200 at the side having a higher hardness on the needle bearing 200, known needle bearings having various structures and shapes may be used, and thus the wear of the needle bearing 200 may be minimized.

Hereinafter, a method of installing the motor 30 and the pump 120 of the hydraulic control apparatus 10 in the modulator block 20 so that the pump pistons 125 are positioned at one side having a higher hardness with respect to the center line C1 of the needle bearing 200 as described above will be described.

First, the needle bearing 200 provided on the rotating shaft 34 of the motor 30 is provided such that the hardness of either the upper portion or the lower portion is high with respect to the center line C1. For example, the needle bearing 200 having a higher hardness on the lower portion with respect to the center line C1 of the needle bearing 200 is installed on the rotating shaft 34. The motor 30 is installed on one side of the modulator block 20 such that the needle bearing 200 provided on the rotating shaft 34 is located in the motor bore 22.

Next, the pump mounting bores 21 are machined such that the center axis C2 is positioned at a side having a higher hardness on the needle bearing 200 and the pump pistons 125 of the pumps 120 contact the needle bearing 200, and the pumps 120 are installed in the pump mounting bores 21. As such, as the lower portion of the needle bearing 200 with respect to the center line C1 is formed to have a higher hardness, the pump mounting bores 21 are machined in a position moved to the lower portion of the center line C1 of the needle bearing 150. The center axis C2 of the pump pistons 125 is positioned below the center line C1 of the needle bearing 200 by installing the pumps 120 in the pump mounting bores 21.

On the other hand, in a case where the pumps 120 are first installed in the pump mounting bores 21 formed in the modulator block 20, the motors 30 are installed such that the center axis C2 of the pump pistons 125 is positioned at a side having a higher hardness on the needle bearing 200. For example, the center axis C2 of the pump pistons 125 may be positioned at a side having a higher hardness with respect to the center line C1 of the needle bearing 200 by machining so as to adjust the depth of the motor bore 22 into which the needle bearing 200 and a part of the rotating shaft 34 are inserted.

As a result, the position of the center axis C2 of the pump pistons 125 is determined according to the relative positions of the needle bearing 200 and the pump pistons 125 in consideration of the endurance performance of the needle bearing 200. That is, as described above, the needle bearing 200 is installed such that the hardness of either the upper portion or the lower portion with respect to the center axis C1 of the needle bearing 200 is higher than the other side and then the pump pistons 125 are installed such that the center axis C2 of the pump pistons 125 is positioned at the side having a higher hardness on the needle bearing 200, or in a state in which the pump pistons 125 are installed, the motor 30 may be installed such that the side of the needle bearing 200 having the higher hardness is positioned above the center axis C2 of the pump pistons 125, so that the durability of the needle bearing 200 may be increased.

Accordingly, the pump pistons 125 and the needle bearing 200 may be installed to have required relative positions through various types of mounting structures such as the movement of the position of the center axis C1 of the pump pistons 125, the adjustment of the hardness of the upper portion or the lower portion of the needle bearing 200 with respect to the center axis C1 of the needle bearing 200, and machining of the motor bore 22 in which the needle bearing 200 is disposed or the pump mounting bores 21 in which the pumps 120 are installed.

As is apparent from the above, the embodiments according to the present disclosure can prevent the oil leaking from the pumps side of the modulator block from entering the inside of the motor, thereby preventing the motor failure and improving the overall product reliability of the brake system.

Further, the embodiments according to the present disclosure can prevent a malfunction due to the movement of the front bearing.

Further, the embodiments according to the present disclosure can prevent a malfunction that may occur due to the movement of the stator of the motor.

Further, the embodiments according to the present disclosure can increase the durability of the needle bearing that drives pump pistons.

Although a few embodiments of the present disclosure have been shown and described, it would be appreciated by those skilled in the art that changes may be made in these embodiments without departing from the principles and spirit of the present disclosure in the scope of which is defined in the claims and their equivalents.

What is claimed is:

1. A hydraulic control apparatus of a brake system comprising:
   a modulator block having a motor bore; and
   a motor including a case accommodating a stator and a rotor and being coupled to the modulator block by mounting bolts, and a cover covering an opening of the case and supported on one side of the modulator block,
   wherein a vent hole for air flow between the inside and the outside of the motor is formed on the cover, and a communication passage for communicating the motor bore and the vent hole is formed in the modulator block,
   wherein the communication passage includes a first vertical bore positioned directly above the vent hole,
   wherein the modulator block includes a bearing bore on which a front bearing is supported,
   gaps are defined between the cover and the modulator block to allow deformation of the cover when the motor is supported by the modulator block, and
   a seat portion for seating the front bearing and pressing the front bearing to the bearing bore by deformation of the cover generated by fastening of the mounting bolts is defined at a central portion of the cover.

2. The hydraulic control apparatus according to claim 1, wherein a step on which the cover is seated is disposed on an inner circumference of an upper end of the case, and
   a flange which is seated and supported on the step to receive a fastening force of the mounting bolts is disposed on an outer circumference of the cover.

3. The hydraulic control apparatus according to claim 2, wherein the cover includes a first surface formed along a circumferential direction at a position adjacent to the outer circumference of the cover and a second surface protruding higher than the first surface, which face the modulator block.

4. The hydraulic control apparatus according to claim 2, wherein the gaps include a first gap defined between the flange and the modulator block and a second gap defined between the modulator block and the second surface of the cover to be relatively smaller than the first gap.

5. The hydraulic control apparatus according to claim 3, wherein the first surface and the surface of the flange are disposed on the same plane so as not to have a step.

6. The hydraulic control apparatus according to claim 3, wherein a partition wall surrounding an outer surface of the front bearing is disposed at the central portion of the cover.

7. The hydraulic control apparatus according to claim 6, wherein the modulator block has a partition wall bore on which the partition wall is supported.

8. The hydraulic control apparatus according to claim 6, wherein the partition wall bore protrudes relatively higher than the second surface.

9. The hydraulic control apparatus according to claim 1, wherein the cover includes a restricting portion extending from the cover to be in contact with the stator installed in the case so as to restrict the up-and-down movement of the stator in the case.

10. The hydraulic control apparatus according to claim 9, wherein a plurality of the restraining portions are arranged to contact different regions of the stator.

11. The hydraulic control apparatus according to claim 9, wherein the restricting portion includes:
    a first restricting portion having a L-shaped surface in contact with the stator; and
    a second restricting portion having a T-shaped surface in contact with the stator.

12. The hydraulic control apparatus according to claim 9, wherein a plurality of the stators are disposed to be spaced apart from each other in a circumferential direction of the case, and
    wherein the circumferential movement of the stators is restrained by an embossing portion protruding between the plurality of stators at the inner wall of the case.

13. The hydraulic control apparatus according to claim 9, wherein a plurality of the stators are disposed to be spaced apart from each other in a circumferential direction of the case, and
    wherein the circumferential movement of the stators is restrained by a clip inserted into a gap between the plurality of stators.

14. A hydraulic control apparatus of a brake system comprising:
    a modulator block having a motor bore; and
    a motor including a case accommodating a stator and a rotor and being coupled to the modulator block by mounting bolts, and a cover covering an opening of the case and supported on one side of the modulator block,
    wherein a vent hole for air flow between the inside and the outside of the motor is formed on the cover, and a communication passage for communicating the motor bore and the vent hole is formed in the modulator block,
    wherein the communication passage includes a first vertical bore positioned directly above the vent hole
    a needle bearing disposed in the motor bore to contact pump pistons accommodated in the modulator block,
    wherein upper and lower portions of the needle bearing with respect to the center line of the needle bearing have different hardness and,
    wherein a center axis of the pump pistons is located at a portion having a relatively high hardness with respect to the center line of the needle bearing.

15. The hydraulic control apparatus according to claim 14, wherein a reinforcing member for reinforcing the strength is disposed on an inner upper portion or an inner lower portion of the needle bearing, and wherein the center axis of the pump pistons is disposed to be biased toward the inner upper portion or the inner lower portion of the needle bearing in which the reinforcing member is located.

16. The hydraulic control apparatus according to claim 14, wherein:
the needle bearing include a ring-shaped inner ring press-fitted into a rotating shaft of motor, a plurality of rollers disposed to be spaced apart from each other by a predetermined distance along an outer periphery of the inner ring, an outer ring surrounding the inner ring and the rollers and provided to be rotatable.

17. The hydraulic control apparatus according to claim 16, wherein:
the needle bearing include a reinforcing member provided on an inner upper portion or an inner lower portion.

18. The hydraulic control apparatus according to claim 17, wherein:
the reinforcing member provided in close contact with the inner ring by being inserted into a groove formed on an inner circumferential surface of the outer ring.

19. A hydraulic control apparatus of a brake system comprising:
a modulator block having a motor bore; and
a motor including a case accommodating a stator and a rotor and being coupled to the modulator block by mounting bolts, and a cover covering an opening of the case and supported on one side of the modulator block,
wherein a vent hole for air flow between the inside and the outside of the motor is formed on the cover, and a communication passage for communicating the motor bore and the vent hole is formed in the modulator block,
a needle bearing disposed in the motor bore to contact pump pistons accommodated in the modulator block,
wherein the needle bearing includes a reinforcing member for strength reinforcement, and a center axis of the pump pistons is positioned with respect to a center line of the needle bearing toward the portion of the needle bearing in which the reinforcing member is positioned.

20. The hydraulic control apparatus according to claim 19, wherein:
the reinforcing member provided as a washer having a predetermined rigidity.

* * * * *